United States Patent [19]

Calderwood

[11] Patent Number: 5,078,827
[45] Date of Patent: Jan. 7, 1992

[54] PNEUMATIC MANDREL FOR MACHINING AND FUSION OF PLASTIC PIPE

[75] Inventor: James C. Calderwood, Tulsa, Okla.

[73] Assignee: McElroy Manufacturing, Inc., Tulsa, Okla.

[21] Appl. No.: 383,171

[22] Filed: Jul. 20, 1989

[51] Int. Cl.⁵ .................. B23B 31/30; B29C 65/00
[52] U.S. Cl. .................. 156/503; 156/304.2; 279/3
[58] Field of Search ............ 156/158, 266, 267, 287, 156/294, 304.2, 382, 423, 503, 497; 264/511, 512, 516; 29/222, 252, 234, 282, 421.1, 743, DIG. 44; 279/3; 269/21; 414/752; 248/206.2, 362, 363; 294/64.1

[56] References Cited

U.S. PATENT DOCUMENTS

| | | | |
|---|---|---|---|
| 397,835 | 2/1889 | Cuthbert | 279/3 |
| 904,679 | 11/1908 | Bruton | 51/235 |
| 2,989,785 | 6/1961 | Stahl | 264/511 |
| 3,137,060 | 6/1964 | Granzer et al. | 29/252 |
| 3,236,533 | 2/1966 | Mullion | 279/3 |
| 3,513,051 | 5/1970 | Lichfield | 156/423 |
| 3,568,633 | 3/1971 | Harrison | 279/3 |
| 3,952,524 | 4/1976 | Rand et al. | 29/421.1 |
| 4,352,708 | 10/1982 | McElroy | 156/378 |
| 4,411,726 | 10/1983 | Woerz et al. | 156/423 |
| 4,680,082 | 7/1987 | Kearney | 156/497 |
| 4,705,311 | 11/1987 | Ragard | 414/752 |
| 4,815,779 | 3/1989 | Glessner et al. | 294/64.1 |

FOREIGN PATENT DOCUMENTS

| | | | |
|---|---|---|---|
| 0728854 | 3/1966 | Canada | 29/743 |
| 0062463 | 5/1940 | Norway | 279/3 |
| 0575967 | 3/1946 | United Kingdom | 279/3 |

Primary Examiner—Michael W. Ball
Assistant Examiner—Steven D. Maki
Attorney, Agent, or Firm—Head & Johnson

[57] ABSTRACT

A pneumatic mandrel for use in machining and fusing plastic pistons and cylinders has a forward end wall with a port therethrough in pneumatic communication with a vacuum pump via a pneumatic tube extending longitudinally through the mandrel. A cylinder may be snugly mounted on the mandrel and may also be fixed against rearward axial movement by a stop member means the rearward end of the mandrel. The cylinder overhangs the forward end wall of the mandrel by substantially the length of the piston so that the end walls of the piston and cylinder will be aligned when the piston head is drawn by vacuum into firm abutment with the forward end wall of the mandrel. Preferably, a sink about the forward end wall port forms a peripheral landing about the end wall to assure firmness in the abutment. Relief ports are also provided through the mandrel for release of the vacuum to facilitate removal of the cylinder and piston from the mandrel.

8 Claims, 3 Drawing Sheets

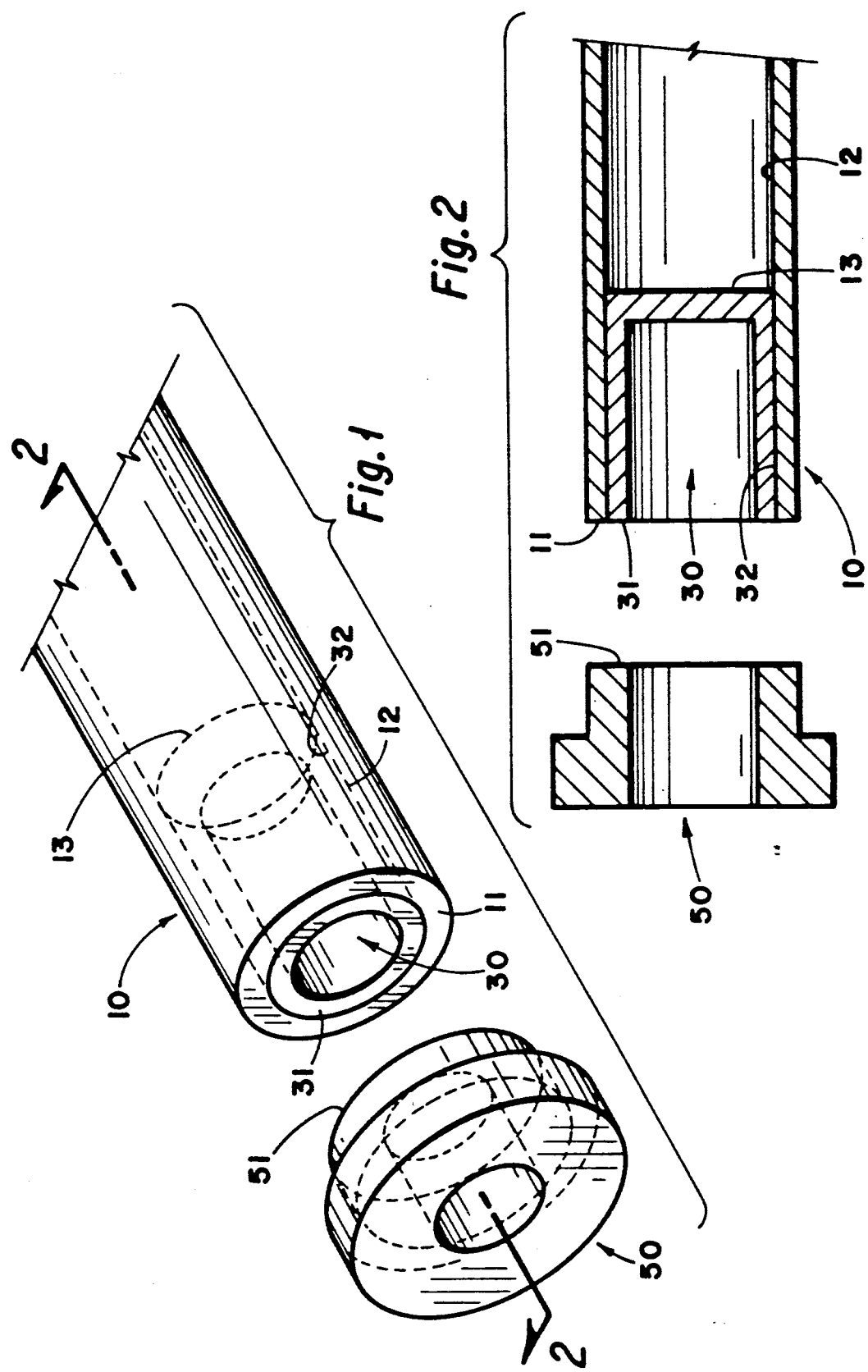

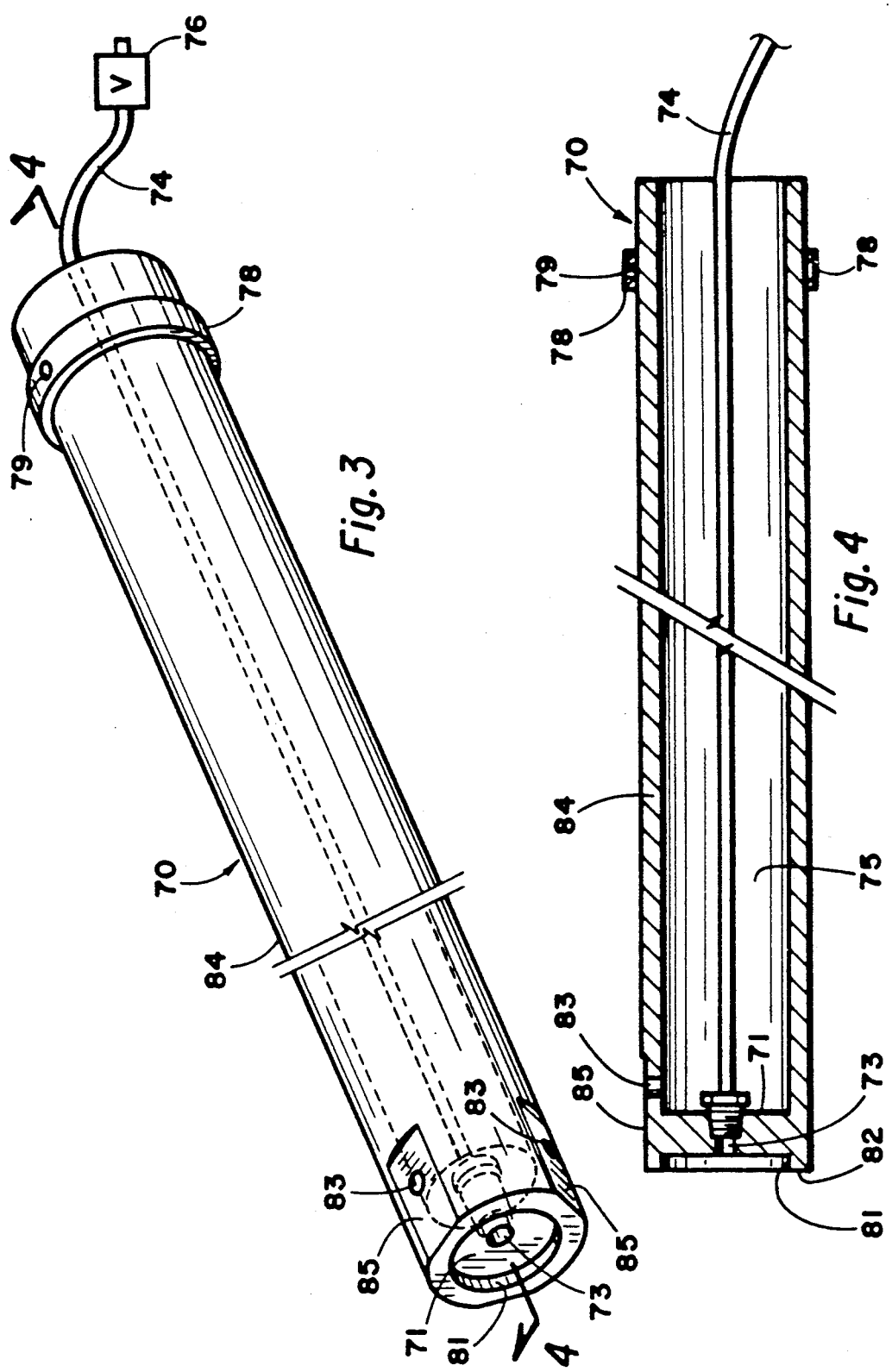

PNEUMATIC MANDREL FOR MACHINING AND FUSION OF PLASTIC PIPE

BACKGROUND OF THE INVENTION

This invention relates generally to apparatus for machining and fusing plastic pipe and more particularly concerns the fusion of the ends of concentric pipes to a base member.

Apparatus for joining plastic pipe in end to end relationship is disclosed in U.S. Pat. No. 4,352,708. That apparatus includes a clamp holding a first section of pipe in fixed position and a second movable clamp holding the second section of pipe to bring it into position for fusion to the first section of pipe. The introduction of a third section of pipe concentric with the first introduces complications not addressed by that apparatus. In the present application, the end faces of a plastic cylinder and a plastic piston are to be fused to a plastic base member without fusing the exterior cylindrical surface of the piston to the interior cylindrical surface of the cylinder. Using the teachings of the previous patent, the base member and the cylinder may be gripped in the moving and fixed clamps respectively and machined, heated and fused under controlled pressure. However, with no means for gripping the cylindrical surface of the piston, the piston is free to rotate under the force exerted by a rotating facing cutter used to simultaneously trim the cylinder and piston end faces. The piston is also subject to an axial force exerted upon it during the application of controlled pressure in the fusion process and to an opposite or pulling axial force exerted upon it by the axial withdrawal of the heater from the softened faces to be fused. There is no prior art device which provides for the gripping of the interior pipe or piston so as to overcome the effect of these forces.

It is, therefore, an object of the invention to provide apparatus useful in the machining and fusion of concentric plastic pipes to a base member. Another object of the invention is to permit fusion of the end walls of a plastic cylinder-piston combination to a plastic base member without causing the cylindrical surfaces of the cylinder and piston to be fused together.

SUMMARY OF THE INVENTION

The present invention provides a mandrel onto which the plastic cylinder may be snugly mounted. The mandrel has a forward end wall with a pneumatic port through it. The cylinder is mounted on the mandrel in a position such that the cylinder will overhang the forward end of the mandrel by the length of the piston. A vacuum pump pneumatically connected to the port in the forward end wall of the mandrel draws a piston in the overhanging portion of the cylinder into a firm abutment with the forward end wall of the mandrel. Preferably, the port through the forward end wall is disposed in a sink in the end wall which forms a landing about the periphery of the end wall so that the periphery of the piston head will be drawn into abutment with the landing. The force of the vacuum is predetermined to be sufficient to overcome the inward, outward and rotational forces to be exerted on the piston during the machining and fusion processes.

BRIEF DESCRIPTION OF THE DRAWINGS

Other objects and advantages of the invention will become apparent upon reading the following detailed description and upon reference to the drawings, in which:

FIG. 1 is a perspective view of a plastic piston within a plastic cylinder for fusion to a plastic end member;

FIG. 2 is a cross section taken along line 2-2 of FIG. 1;

FIG. 3 is a perspective view of a preferred embodiment of the pneumatic mandrel;

FIG. 4 is a cross-section taken along the line 4-4 of FIG. 3; and

Figure 5:
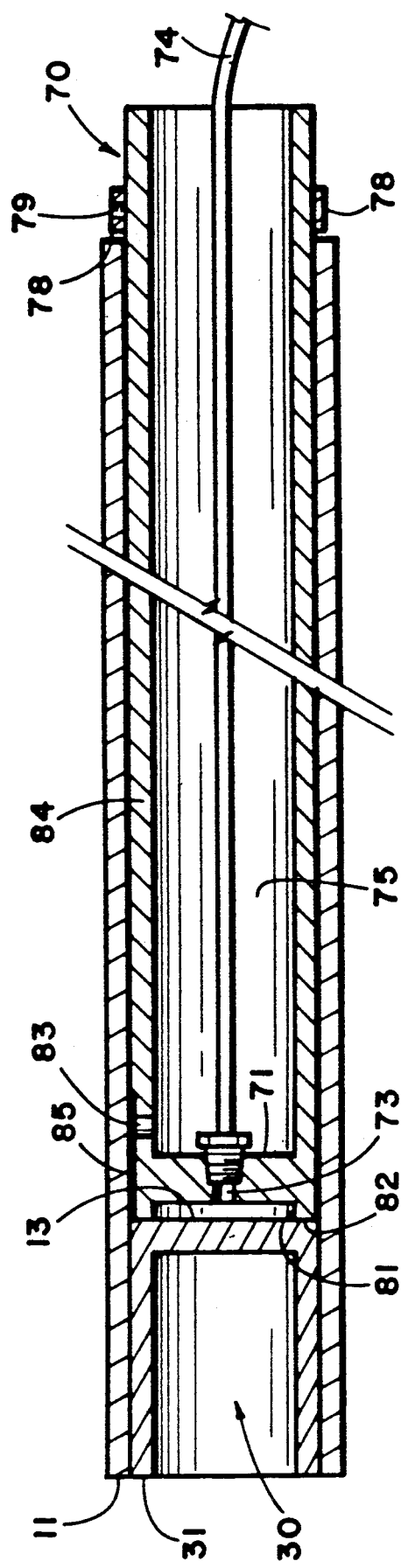
FIG. 5 is a sectional view of the cylinder and piston mounted on the mandrel.

While the invention will be described in connection with a preferred embodiment, it will be understood that it is not intended to limit the invention to that embodiment. On the contrary, it is intended to cover all alternatives modifications and equivalents as may be included within the spirit and scope of the invention as defined by the appended claims.

DETAILED DESCRIPTION OF THE INVENTION

FIGS. 1 and 2 illustrate a plastic cylinder 10 with a plastic piston 30 disposed therein and a plastic base member 50. It is desired to fuse the end faces 11 and 31 of the cylinder 10 and the piston 30 to the end face 51 of the base member 50 by use of the apparatus and principles disclosed in U.S. Pat. No. 4,352,708. This is to be accomplished without fusing the internal cylindrical wall 12 of the cylinder 10 to the external cylindrical wall 32 of the piston 30.

The present apparatus to be used in conjunction with the previously patented apparatus is illustrated in FIGS. 3 and 4. It includes a mandrel 70 which has an outer diameter substantially equal to the inner diameter of the cylinder 10 and the outer diameter of the piston 30. The mandrel 70 is hollow and closed at one end by a forward end wall 71. A port 73 in the forward end walls 71 of the mandrel 70 is connected to a pneumatic tube 74 extending longitudinally in the hollow chamber of the mandrel 70 to form an axial pneumatic passage through the mandrel 70. The other end of the tube 74 is connected to an external vacuum pump 76. The snug fit of the cylinder 10 or the mandrel 70 is sufficient to hold the cylinder 10 in place until the cylinder is clamped to the mandrel 70. In addition, a stop member 78 may be mounted on the exterior of the mandrel 70 proximate its open end 72. Preferably, the stop member 78 will include means, such as set screws 79, to permit slidable adjustment and fixing of the stop member 78 along the axis of the mandrel 70.

In the preferred embodiment, the forward port 73 will be disposed in a cylindrical sink 81 forming a landing 82 along the exterior periphery of the forward end wall 71. One or more relief ports 83 may also be provided through the cylindrical wall 84 of the mandrel 70. In the preferred embodiment, three such relief ports 83 are spaced at 120° intervals around the mandrel 70 proximate its forward end face 71. Flat faces 85 extend along the outer cylindrical surface of the mandrel 70 from the landing 82 to and including each of the relief ports 83.

In operation, the stop member 78, if any, may be positioned axially along the mandrel 70 such that the distance from the landing 82 to the stop member 78 plus the length of the piston 30 is substantially equal to the length of the cylinder 10. Otherwise, the cylinder 10 is snugly slid into the mandrel 70 until this condition is achieved. The piston 30 is then inserted snugly into the cylinder 10 with the piston head 13 leading. The vacuum pump 96 is then energized to draw the piston 30 into the cylinder 10. In the preferred embodiment, the central portion of the piston head 13 is sucked toward the port 73 in the sink 81 so that the periphery of the piston head 13 is pulled into firm abutment with the landing 82. Thus the piston 30 is secured against axial and rotational motion.

With the piston 30 and cylinder 10 so mounted on the mandrel 70, the cylinder 10 and the member 50 may be clamped in the apparatus of the previous U.S. Pat. No. 4,352,708 (not shown) for machining and fusion in accordance with that invention When the fusion process is complete, the base member 50 with the piston 30 and cylinder 10 fused thereto are removed with the mandrel 70 from the machining and fusing apparatus.

The vacuum pump 76 is de-energized and the vacuum pressure released through the relief ports 83 so that the cylinder 10 and piston 30 may be easily slid off the mandrel 70.

Thus, it is apparent that there has been provided, in accordance with the invention, a device that fully satisfies the objects, aims and advantages set forth above. While the invention has been described in conjunction with a specific embodiment, many alternatives, modifications and variations will be apparent to those skilled in the art in light of this description. It is intended to embrace all such alternatives, modifications and variations as fall within the spirit of the appended claims.

What is claimed is:

1. For use in machining and fusing the end walls of a plastic piston and cylinder to a plastic base member, apparatus comprising:
   a mandrel of outer diameter substantially equal to the outer diameter of the piston and the inner diameter of the cylinder having a cylindrical wall and a forward end wall with an exterior sink forming a landing about its periphery and a first port through said sink;
   a vacuum source;
   a pneumatic tube extending longitudinally within said mandrel connecting said port to said vacuum source; and
   means for securing the cylinder on said mandrel such that the cylinder overhangs the forward end of said mandrel by substantially the length of the piston;
   means for selectively activating said vacuum source whereby the piston may be drawn into the cylinder mounted on said mandrel and into firm abutment with said landing; at least one relief port extending through said cylindrical wall of said mandrel.

2. Apparatus according to claim 1 further comprising three relief ports extending through said cylindrical wall of said mandrel.

3. Apparatus according to claim 2 further comprising a plurality of flat faces extending axially on the exterior cylindrical surface of said mandrel from said landing, each one including one of said relief ports therein.

4. Apparatus according to claim 3, said relief ports being disposed proximate the forward end wall of said mandrel.

5. Apparatus according to claim 4, said relief ports being centered on a plan perpendicular to the axis of said mandrel.

6. Apparatus according to claim 5, said relief ports being disposed at 120° intervals.

7. Apparatus according to claim 1, said sink being concentric with said mandrel.

8. Apparatus according to claim 1, further comprising stop means adjustable axially along said mandrel to restrict rearward movement of the cylinder on said mandrel.

* * * * *